Dec. 23, 1958 L. A. RUNTON 2,865,214
ULTRA HIGH SPEED ENDLESS BELTS
Filed April 10, 1957

INVENTOR
LESLIE A. RUNTON

BY

ATTORNEY

United States Patent Office 2,865,214
Patented Dec. 23, 1958

2,865,214
ULTRA HIGH SPEED ENDLESS BELTS

Leslie A. Runton, Middle Haddam, Conn., assignor to The Russell Manufacturing Company, Middletown, Conn., a corporation of Connecticut Application April 10, 1957, Serial No. 651,862

3 Claims. (Cl. 74—231)

This invention relates to ultra high speed belts and more particularly to power belts of the type used for driving spindles at speeds of the order of 70,000 to 100,000 R. P. M.

It has been found that with a flat belt operating on a pulley having a smooth surface air builds up to form an air cushion between the belt and the pulley. This air cushion causes the belt to eventually slip off the pulley. The belt also picks up oil and lint or dirt which further increase the tendency to slip from the pulley after a limited time.

An object is to provide a belt of the above type which does not tend to slip off of the pulley when operated at high speeds.

Other objects and advantages will be apparent as the nature of the invention is more fully disclosed.

In accordance with the present invention the belt is formed with transverse grooves forming teeth therebetween on its contacting surface. The teeth deflect as the belt bends in passing around the pulley and in so doing wipe the pulley surface so as to remove oil or lint. The transverse grooves allow the air to be forced out at either side of the belt and prevent an air cushion from being built up between the belt and pulley. The air which is expelled from the grooves also removes any oil or lint which may have been picked up and provides means for automatically cleaning the belt and the pulley surface.

It has been found that such belts can be operated at high speeds for long periods of time without manual cleaning and without slipping from the pulley.

The nature of the invention will be better understood by referring to the following description, taken in connection with the accompanying drawing in which a specific embodiment has been set forth for purposes of illustration.

Figure 1:
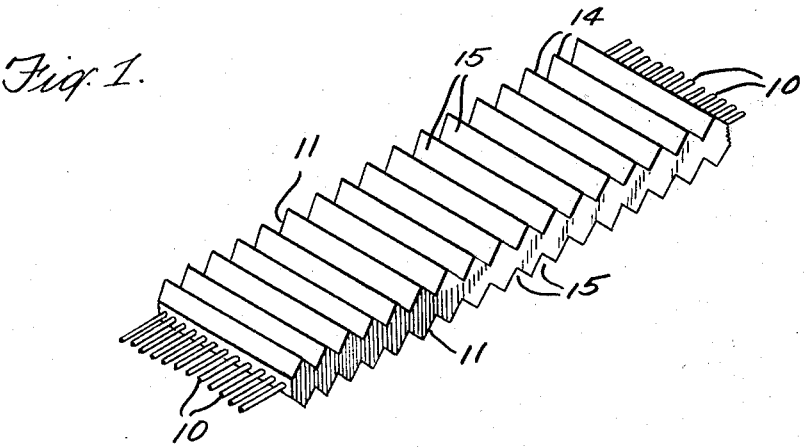
Fig. 1 is a perspective view on an enlarged scale of a belt embodying the invention.
Figure 2:
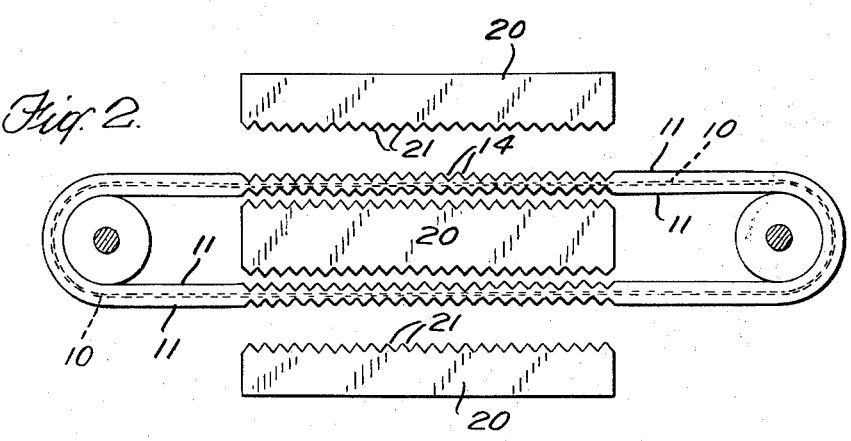
Fig. 2 is a diagrammatic view of a vulcanizing station for forming the belt.
Figure 3:
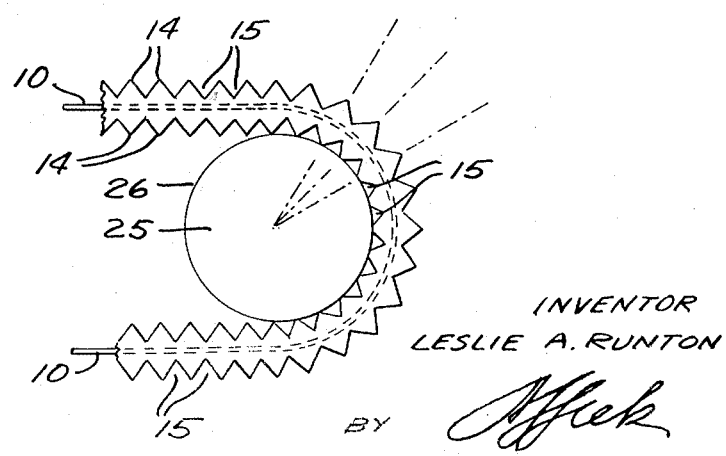
Fig. 3 is a section on a larger scale showing the belt applied to the smooth surface of a pulley.

Referring to the drawing more in detail, the belt is shown as composed of a web 10 which may consist of a woven fabric having a high tensile strength and high flexibility. Continuous Dacron filaments (polyethylene terephthalate) are particularly suitable as they combine the characteristics above mentioned with high heat resistance.

The fabric layer 10, which is woven in the form of a tube from which sections are cut to form an endless web, is impregnated with a natural or synthetic rubber composition to form layers 11 at each side of the fabric. A plurality of transverse teeth 14 separated by grooves or channels 15 are formed in the rubber layers 11 on one or both surfaces of the belt. The rubber layers 11 are vulcanized to the permanent flexible form required.

The belt above described may be made by weaving the fabric layer in the form of a tube which is impregnated and coated with natural or synthetic latex to form the layers 11 on each side of the fabric or yarn layer 10. The tube is then placed between heated platens 20 having teeth 21 formed in the clamping surfaces thereof, which impress the layers 11 and form the teeth 14 therein during the vulcanizing operation.

The teeth 21 may be formed directly in the surface of the platen or may be formed by passing a brass strip between gear teeth to bend the strip into serrated shape. The strip so formed may be placed over the face of the platen in contact with the rubber layer 11 to impress the same as above described during vulcanization.

The teeth 14 are formed entirely within the layers 11 so that the fabric layer 10 is not distorted but extends substantially straight through the belt to provide the required longitudinal strength. The portion of the rubber between the base of the teeth and the fabric layer improves the flexibility of the teeth as the belt bends around the pulley.

The belt in passing around a pulley 25 having a smooth surface 26 flexes and causes the points of the teeth 14 to wipe the surface of the pulley and any air which is drawn along by the belt is expelled from the ends of the grooves 15 so that no air cushion can form between the belt and pulley.

Teeth 14 have been shown as formed on both surfaces of the belt so that the belt can be reversed for longer life. If the belt is not to be reversible the teeth can be omitted from the outer surface to reduce the windage.

What is claimed is:

1. A power transmission mechanism comprising a smooth surface spindle devoid of end flanges which is adapted to be rotated at high speeds in the order of 70,000 to 100,000 R. P. M., an ultra high speed belt by which said spindle is rotated, said belt comprising an endless layer of high tensile strength highly flexible woven yarn fabric impregnated with a displaceable rubber-like composition forming layers on each side of said fabric, the inner driving surface layer being provided with contiguous V-shaped open ended transversely extending grooves, said grooves defining therebetween contiguous V-shaped sharp edged teeth extending from side to side of said belt which are adapted to engage the smooth surface of said spindle and to flex and displace as the belt bends around said spindle and to thereby wipe the surface of said spindle and to expel entrained air in said grooves through the open ends thereof and thereby prevent any building up of an air cushion between said belt and said spindle.

2. An ultra high speed endless belt for driving a smooth surface fully devoid of end flanges at speeds in the order of 70,000 to 100,000 R. P. M. which comprises an endless layer of high tensile strength highly flexible woven yarn fabric impregnated with a displaceable rubber-like composition forming layers on each side of said fabric, the inner driving surface layer being provided with contiguous V-shaped open ended transversely extending grooves which extend from side to side of said belt, said grooves defining therebetween contiguous V-shaped sharp edged teeth extending from side to side of said belt which are adapted to engage the smooth surface of a pulley and to flex and displace as the belt bends around the pulley and to thereby wipe the surface of the pulley, and to expel any entrained air in said grooves through the open ends thereof and thereby prevent any building up of an air cushion between the belt and the pulley.

3. An ultra high speed belt as defined in claim 2 in which the outer surface layer of said belt is also provided with alternate contiguous V-shaped transversely extending open ended grooves and sharp edged teeth, whereby the belt is reversible for longer wear.

References Cited in the file of this patent

UNITED STATES PATENTS

| | | |
|---|---|---|
| 235,018 | Poullain | Nov. 30, 1880 |
| 1,412,309 | Lambert | Apr. 11, 1922 |
| 1,994,604 | Bohne | Mar. 19, 1935 |
| 2,430,500 | Freedlander et al. | Nov. 11, 1947 |
| 2,728,239 | Adams | Dec. 27, 1955 |
| 2,838,946 | Kiekhaefer | June 17, 1958 |

FOREIGN PATENTS

| | | |
|---|---|---|
| 380,802 | Great Britain | Sept. 19, 1932 |